Patented Nov. 12, 1946

2,410,948

UNITED STATES PATENT OFFICE 2,410,948

DERIVATIVES OF 3,4 - DIHYDROXY - THIOPHAN AND PROCESS FOR THE MANUFACTURE OF SAME

Paul Karrer, Zurich, Switzerland, assignor to Hoffmann-La Roche Inc., Nutley, N. J., a corporation of New Jersey No Drawing. Application August 26, 1944, Serial No. 551,442. In Switzerland December 23, 1943

5 Claims. (Cl. 260—329)

Derivatives of 3-keto-4-hydroxy-thiophan, of its dioximes and osazones of the general formula

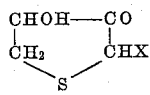

the substituent X in position 2 possessing an aliphatic character and representing, for instance, the groups —CH$_2$CH$_2$COOC$_2$H$_5$, —CH$_2$CH$_2$CH$_2$OCH$_3$,
—(CH$_2$)$_4$OCH$_3$, —(CH$_2$)$_4$CN, can be obtained by halogenating derivatives of thiophan-3-one which are substituted in position 2, subjecting the resulting halogen-ketones to hydrolysis and preparing from the resulting derivatives of 3-keto-4-hydroxy-thiophan the corresponding dioximes and osazones.

It has been found that these derivatives of 3-keto-4-hydroxy-thiophan can be converted into the corresponding derivatives of 3,4-dihydroxy-thiophan of the general formula

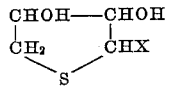

by means of suitable reducing agents.

These new compounds are to be used for the manufacture of medicinal preparations.

Example 1

4.5 parts by weight of 2-(delta-carbomethoxy-butyl)-4-hydroxy-thiophan-3-one are dissolved in 150 parts by volume of isopropyl-alcohol and 80 parts by volume of dry benzene and heated to boiling for 16 hours after addition of 60 parts by weight of freshly distilled aluminium-isopropylate under exclusion of moisture, while allowing a dry nitrogen-stream to pass through. Thereby, the temperature of the heating-bath is chosen in such a way that during the time in question about 100 parts by volume of liquid are distilled off. For the purpose of completing the interchange of ester radicals, it is advisable to add about 35 parts by volume of isopropyl-alcohol to the distillation-residue after the first 10 hours. After 16 hours the solvent is completely removed by distilling off in vacuo. To the residue then remaining behind, water is first added while cooling and then 20 per cent sulphuric acid, the quantity of which has been calculated to enable the aluminium-hydroxide to dissolve. Sodium-chloride is added to the resulting solution and then it is extracted with an organic solvent, e. g., with ether. The ethereal extracts are washed with a dilute solution of potassium-bicarbonate, the ether carefully distilled off and the residue dried, first in an ordinary vacuum, finally in high vacuo at 50° C., and then taken up in a mixture of 20 parts by weight of absolute ether and 4 parts by weight of low-boiling petroleum-ether. After standing for some time at 0° C., colourless crystals of 2-(delta-carboisopropoxy-butyl)-3,4-dihydroxythiophan emerge, which are separated from the mother-liquor and washed with strongly cooled absolute ether. After renewed dissolving and allowing to crystallize from aqueous alcohol, the product forms colourless platelets melting at 96° C.

The di-p-nitro-benzoic acid ester of this dihydroxythiophan compound (which can be prepared by means of p-nitro-benzoyl-chloride in pyridine) melts at 131–133° C. The corresponding di-p-toluene-sulphonic ester is also easily obtainable. By careful saponification, the free acid is obtained from the isopropyl-ester. After recrystallization from water it melts at 142–143° C.

Example 2

0.471 part by weight of 2-($\beta$-carbomethoxy-ethyl)-4-hydroxy-thiophan-3-one, prepared by causing the calculated quantity of diazo-methane to act on 2-($\beta$-carboxy-ethyl)-4-hydroxy-thiophan-3-one, are boiled for 16 hours with 7 parts by weight of aluminium-isopropylate in 20 parts by volume of absolute isopropanol and 10 parts by volume of absolute benzene. After boiling for 10 hours, a further 15 parts by volume of isopropanol is added. While heating, part of the solvent distills off. After completion of the reaction, the rest of the solvent is evaporated in vacuo, the residue decomposed with water and that quantity of dilute sulphuric acid added which is required for dissolving the aluminium-hydroxide. The aqueous solution saturated with sodium-chloride is repeatedly shaken with ether and the oil remaining after evaporation of the ether brought to crystallization from a mixture of 15 parts by volume of absolute ether and very little chloroform at low temperature. 2-($\beta$-carboisopropoxy-ethyl)-3,4-dihydroxy-thiophan is obtained in colourless crystals of melting point 97° C.

I claim:
1. A process for the manufacture of 2-(delta-carboisopropoxy-butyl)-3,4-dihydroxy-thiophan, comprising reducing 2-(delta-carbomethoxy-butyl)-4-hydroxy-thiophan-3-one.
2. A process for the manufacture of 2-(delta- carboisopropoxy-butyl)-3,4-dihydroxy-thiophan, comprising acting aluminium-isopropylate on 2-(delta - carbomethoxy - butyl)-4-hydroxy - thiophan-3-one.

3. Compounds of the general formula

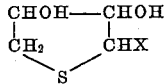

wherein X represents —$(CH_2)_n$—R, $n$ being an integer, and R being a member of the group consisting of alkoxy, carbalkoxy, and CN.

4. The compound 2-(delta - carboisopropoxy-butyl)-3,4-dihydroxy-thiophan represented by the formula

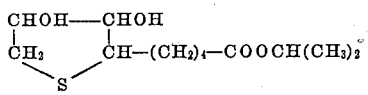

5. A process for the manufacture of substituted 3,4-dihydroxy-thiophan, represented by the formula

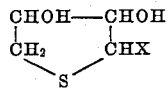

wherein X represents —$(CH_2)_n$—R, $n$ being an integer, and R being a member selected from the group consisting of alkoxy, carbalkoxy, and CN, which comprises reducing the corresponding 3-keto compound of the general formula

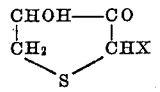

in which X has the above significance.

PAUL KARRER.